US006173749B1

(12) United States Patent
Johnson

(10) Patent No.: US 6,173,749 B1
(45) Date of Patent: Jan. 16, 2001

(54) WALLPAPER BORDER APPLICATION KIT

(76) Inventor: Rex Allen Johnson, 413 Greenleaf Dr., Evansville, IN (US) 47710

( * ) Notice: Under 35 U.S.C. 154(b), the term of this patent shall be extended for 0 days.

(21) Appl. No.: 09/285,146

(22) Filed: Apr. 1, 1999

Related U.S. Application Data

(60) Provisional application No. 60/083,186, filed on Apr. 27, 1998.

(51) Int. Cl.[7] .......... B32B 31/00

(52) U.S. Cl. .......... 156/574; 156/577; 156/579

(58) Field of Search .......... 156/71, 574, 577, 156/579

(56) References Cited

U.S. PATENT DOCUMENTS

| | | | | |
|---|---|---|---|---|
| 5,328,543 | * | 7/1994 | Campagna | 156/574 |
| 5,403,430 | * | 4/1995 | Araujo et al. | 156/523 |
| 5,453,152 | * | 9/1995 | Mazzola et al. | 156/577 |
| 5,478,432 | * | 12/1995 | Vester | 156/574 |
| 5,573,630 | * | 11/1996 | Edney et al. | 156/577 |
| 5,743,485 | * | 4/1998 | Martorelli et al. | 242/597.7 |
| 5,775,633 | * | 7/1998 | Zane | 242/599.1 |

* cited by examiner

*Primary Examiner*—James Sells
(74) *Attorney, Agent, or Firm*—George H. Morgan

(57) ABSTRACT

The present invention is a device of applying wall paper border comprising a tray with an upturned edge, such as a box lid, with a shaft for holding a roll of wallpaper border with a threaded clearance for the attachment of a pole. The tray has at least one cushion of an expanded cellular foam rubber or plastic so as to provide a friction engagement of the tray against a wall upon leaning of the device against the wall whan the tray is used in conjunction with a pole suitable for the intended height of the wallpaper border. The tray with the shaft in a container serves as a neat package for shipping, tansporting, and storage and as point of purchase display item. The container also serves for storage of incidental items useful for installing wall paper borders such as a sponge, a squeegee, a razor, a brush, and an instruction sheet. The instruction sheet also can convey information such as usage instructions or advertising material appropriate for a point of purchase display. The tray with the upturned edge serves as a pan to catch liquid adhesive in the event said liquid adhesive starts to drip or flow from the roll of wall paper border as it is supported by the tray.

11 Claims, 4 Drawing Sheets

WALLPAPER BORDER APPLICATION KIT

CROSS REFERENCES TO RELATED APPLICATIONS

Provisional Application No. 60/083,186 of Apr. 27, 1998. Applicant proclaims priority pursuant to 35 U.S.C. Par. 119(e)(i).

Statement as to Rights to inventions made under Federally sponsored research and development: Not applicable.

BACKGROUND OF THE INVENTION

1. Field of the Invention

This invention relates to a kit that includes an improved wallpaper border applicator that also is a part of the package in which it can be shipped, transported or stored, primarily intended for, but not restricted to, the do-it-yourself home remodeler.

2. Background Information

It is desirable to have an improved simple device for the purpose of installing wall paper borders that enables a typical do-it-yourselfer to safely and conveniently install a wall paper border.

A LEXIS-NEXIS information search uncovered the following:

| | | |
|---|---|---|
| 5,478,432 | 12/26/95 | Vester |
| 5,453,152 | 9/26/95 | Mazzola |
| 5,403,430 | 4/04/95 | Araujo |
| 5,328,543 | 7/12/94 | Campagna |

U.S. Pat. No. 5,328,543 by Campagna, Jul. 12, 1994 is the closest to the present invention. It permits one person to apply a wall paper border on a wall by having an application means that includes a can with a slot, a spindle, and a long pole. A roll of wall paper border is contained within the can and pulled through a slot. The device is leaned against the wall near the person applying a wall paper border. The person applying the wall paper border pulls the wall paper border through a slot in the can as required. The person then repositions Campagna's invention, as well as the ladder or chair on which the person was standing, as required to move along the wall, applying wall paper border. Campagna is more complex than the present invention, which will be apparant from the subsequent description of the preferred embodiment of the present invention. Compagna does not stay in place when leaned against the wall as well as could be desired. Also, excess liquid adhesive tends to drip from Compagna. As will be shown in the subsequent description of the preferred embodiment of the present invention, these and other shortcomings in the present state of the art are overcome.

SUMMARY OF THE INVENTION

The present invention is a device for applying wall paper border comprising a tray with an upturned edge, such as a box lid, with a shaft for holding a roll of wall paper border, said shaft having a threaded clearance for the attachment of a pole. The tray has at least one cushion of an expanded cellular foam rubber or plastic so as to provide a friction engagement of the tray against a wall when the tray positioned against the wall when the tray is used in conjunction with a pole suitable for the intended height of the wallpaper border. The tray with the shaft in a container serves as a neat package for shipping, transporting, and storage and as a point of purchase display item. The container also serves for storage of incidental items useful for installing wall paper borders such as a sponge, a squeegee, a razor, a brush, and instructions. The container also serves as a carrier for signs which can convey information such as usage instructions or advertising material such as is appropriate for a point of purchase display. The tray with the upturned edge serves as a pan to catch liquid adhesive in the event said liquid adhesive starts to drip or flow from the roll of wall paper border as it is held on the shaft. When the device is packaged as a kit, an extra cushion can be included for installation on a bottom end of the pole to be used with the device to minimize risk of slippage of the pole on a floor.

DESCRIPTION OF THE PREFERRED EMBODIMENTS

Figure 2:
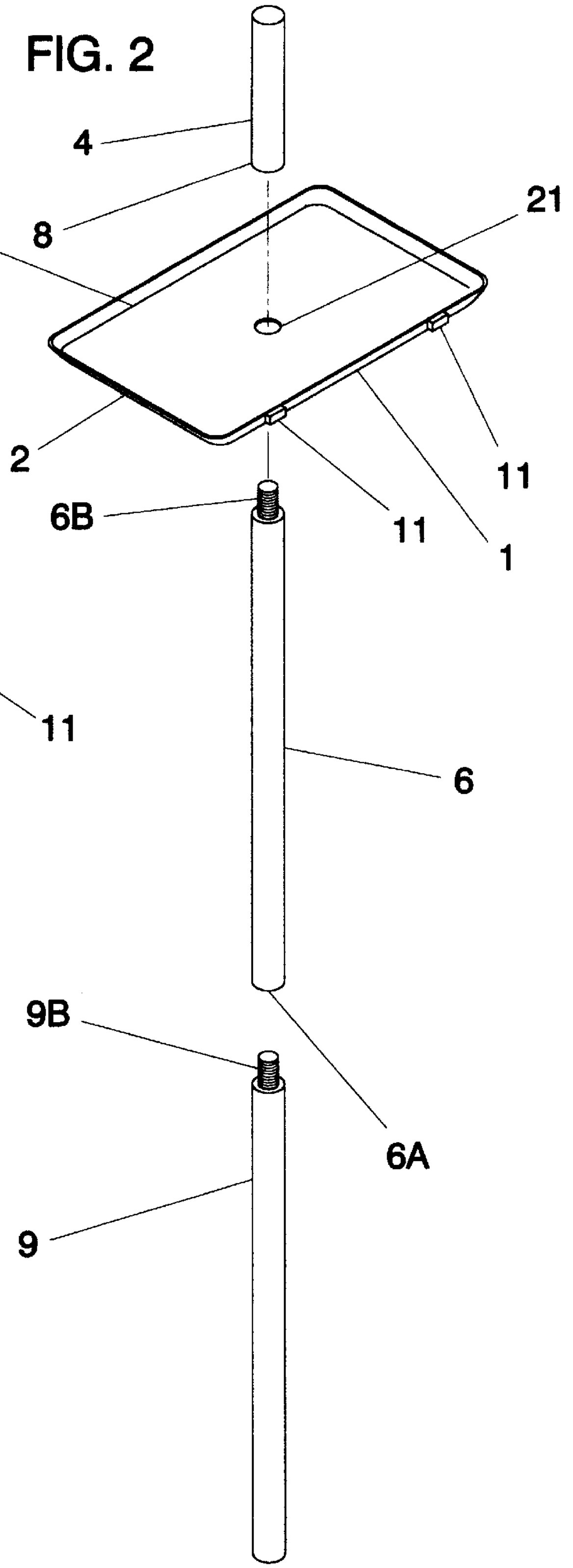
FIG. 2 illustrates an exploded view of the present invention.
Figure 1:
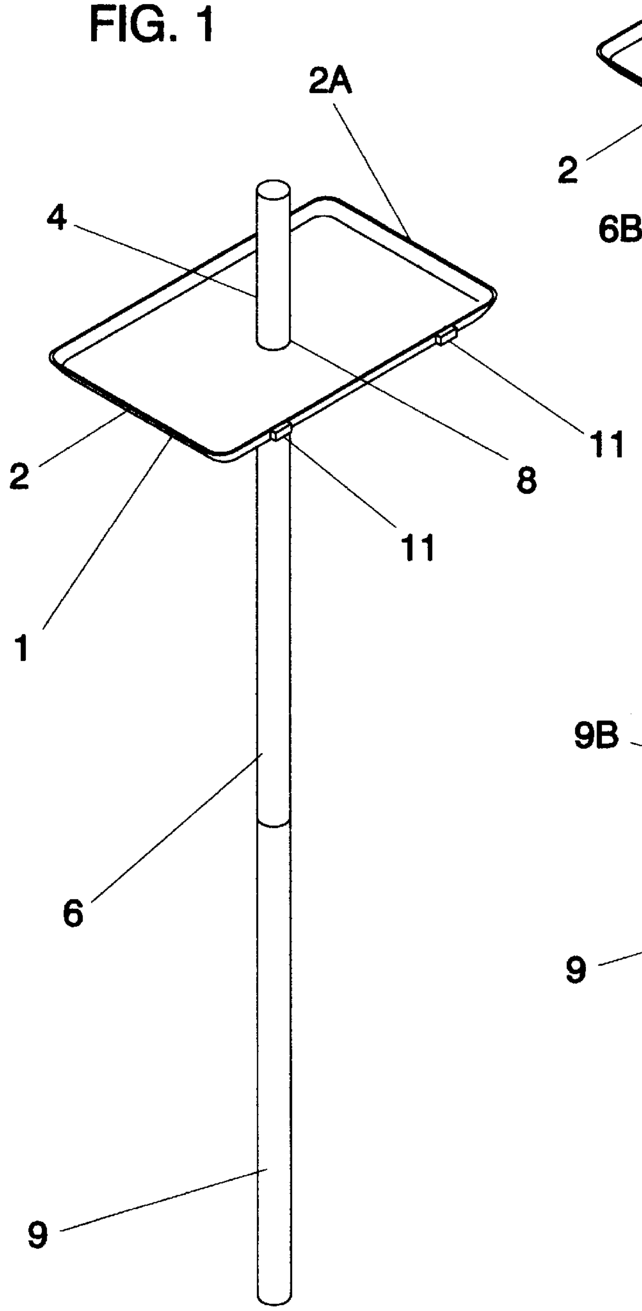
FIG. 1 illustrates the present invention.

FIGS. 1 and 2 illustrate a preferred embodiment of the present invention, a device 1 useful in the application of a wallpaper border, comprising a pole 6, a tray 2 with an upturned edge 2A, and a shaft 4. The tray 2 with the upturned edge 2A further comprises a clearance 21 and at least one cushion 11. The pole 6 comprises a threaded stud 6B and a threaded clearance 6A. An extension pole 9 is shown which comprises an extension threaded stud 9B which permits threading of the extension pole 9 into the threaded clearance 6A of the pole 6 as required. The shaft 4 comprises a shaft threaded clearance 8.

Figure 4:
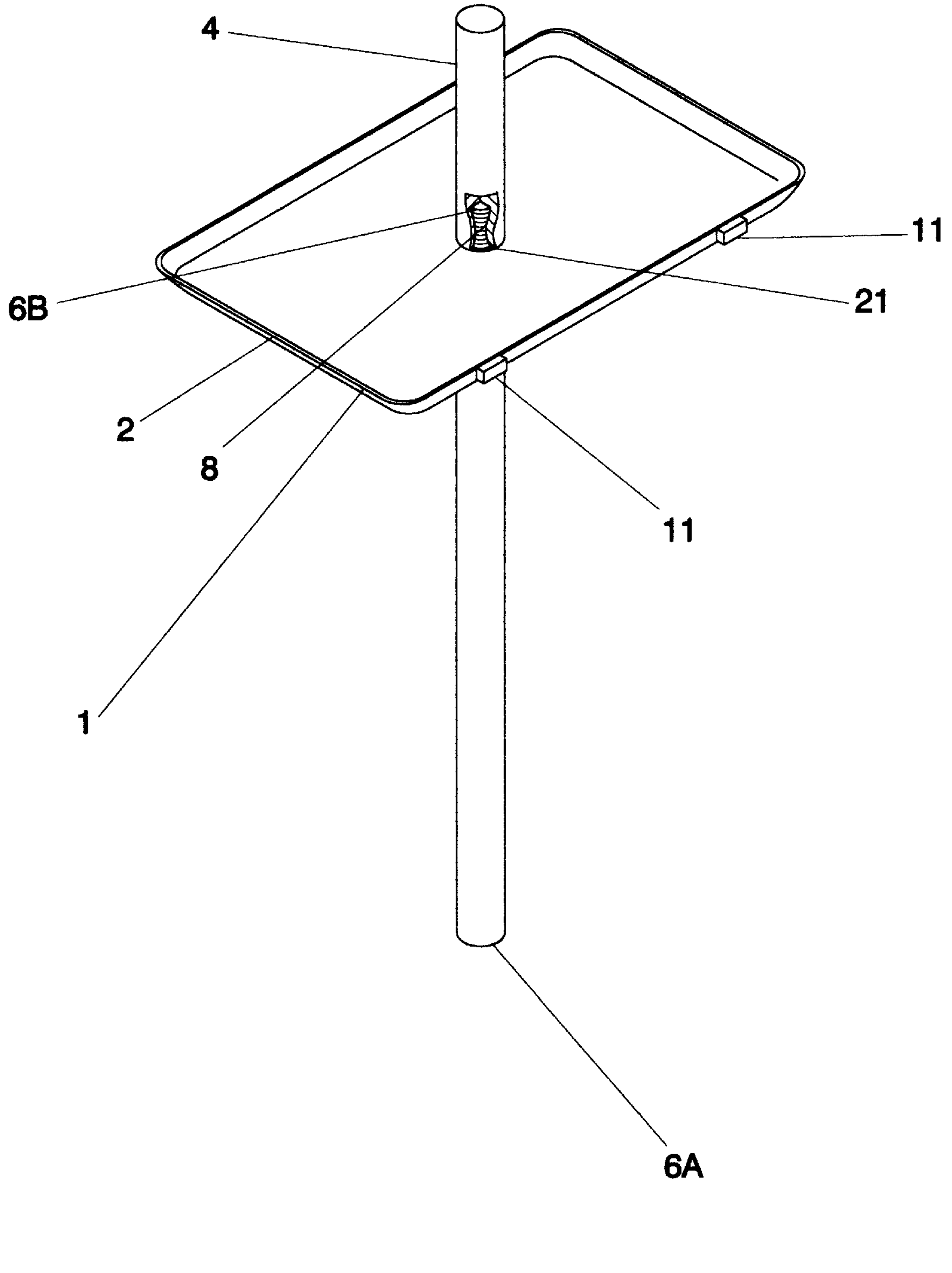
FIG. 4 illustrates details of the present invention.

As shown in FIGS. 1, 2, and 4, the pole 6 engages the shaft 4 by screwing in the threaded stud 6B of the pole 6 into the shaft threaded clearance 8 of the shaft 4, with the tray 2 contained between the pole 6 and the shaft 4. The clearance 21 of the tray 2 is sized, in the preferred embodiment of the present invention, so that the clearance 21 slips over the threaded stud 6B but not over the pole 6, so the tray 2 is held between the shaft 4 and the pole 6.

Figure 3:
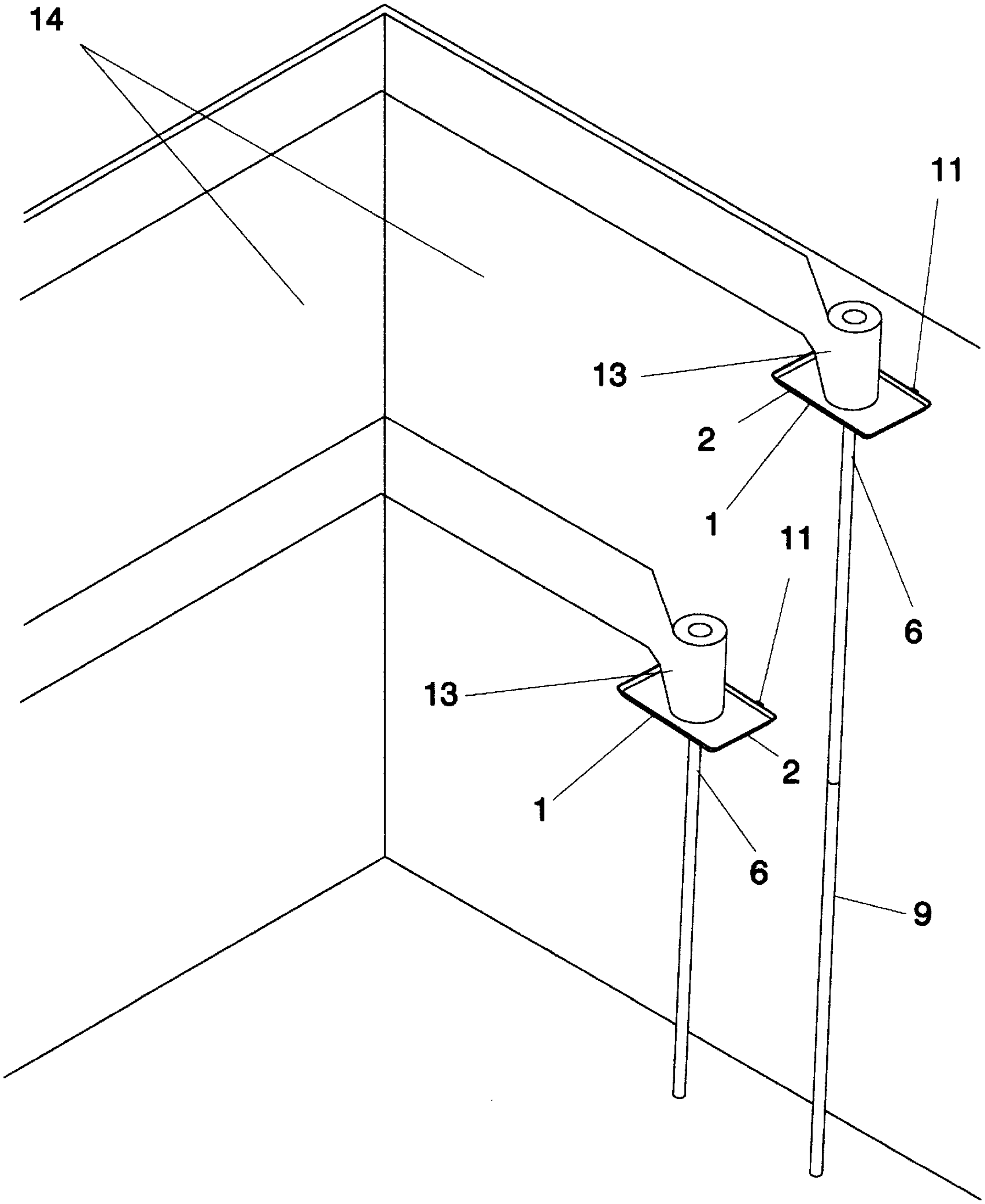
FIG. 3 illustrates applications of the present invention.

FIG. 3 illustrates the preferred embodiment of the present invention, the device 1 with a roll of wall paper border 13 in the process of being applied on a wall 14. The roll of wall paper border 13 has been placed over the shaft 4 and is resting on the tray 4. The tray 4 supports the roll of wall paper border 13 as it is being applied to the wall 14. The upturned edge 2A of the tray 2 serves to catch any adhesive leaking from the roll of wall paper border 13. The at least one cushion 11 serves to create friction between the tray 2 and the wall so as to lessen the chance of the device 1 sliding off the wall and falling to the floor. This is a unique feature of the present invention over prior art, as well as the tray 2 with an upturned edge 2A and the shaft 4.

FIG. 3 shows how the extension pole 9 can be used to adjust the height of the roll of wall paper border 13 as it is applied.

Figure 5:
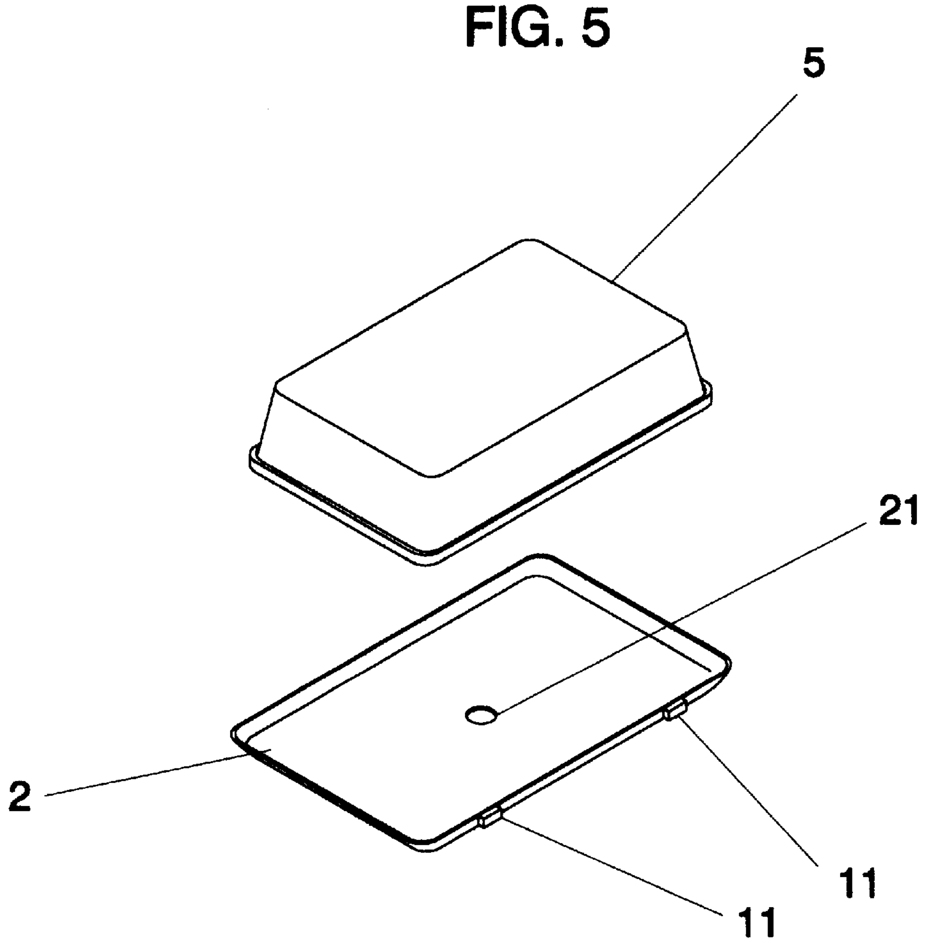
FIGS. 5 and 6 illustrate the present invention embodied as a kit.
Figure 6:
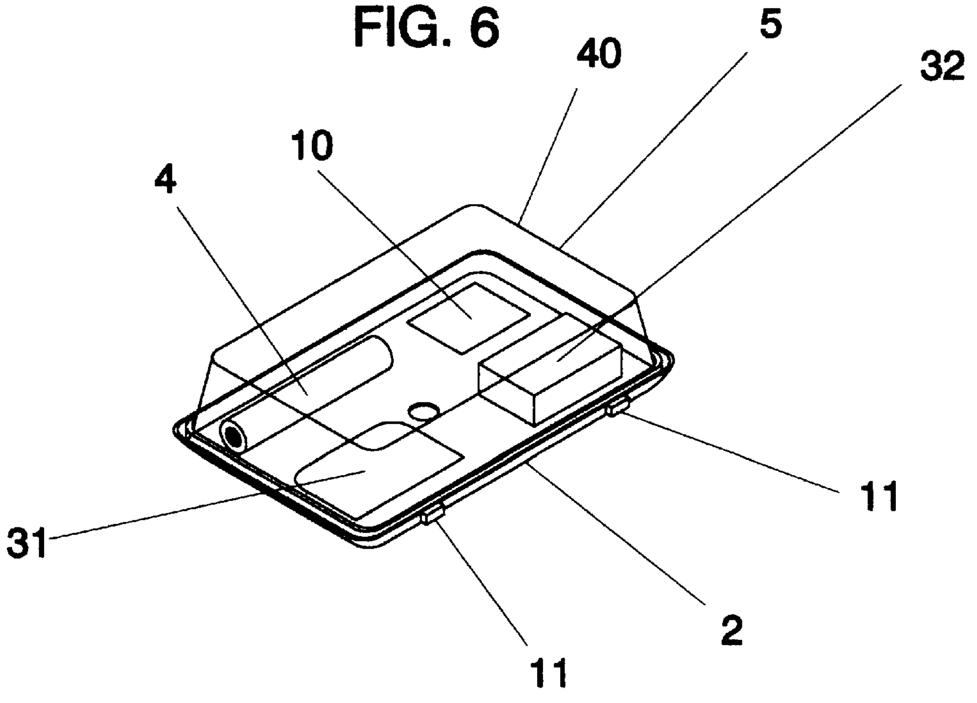

FIGS. 5 and 6 illustrate details of the present invention, the device 1, as a kit 40. A container 5 is shown that accepts the tray 2, which serves as a lid when the container 5 is a box. The container 5, in the preferred embodiment of the present invention, is of a clear plastic. The container 5 could be a plastic bag, in which case the container 5 would contain the tray 2 and the shaft 4. The kit 40, would include, as a minimum, the tray 2 and the shaft 41. However, as a convenience item, the kit 40 would include additional items such as a squeegee 31, a sponge 32, and an instruction sheet 10. The squeege 31 and the sponge 32 are useful in applying the roll of wallpaper border 13 to the wall 14 (Ref. FIG. 3). The kit 40 makes an attractive point of purchase display unit for a merchant hawking his wares.

The pole 6 and the extension pole 9 are readily available in stores for use with paint rollers, mops, and other household items. By having a tray 2 and a shaft 4 available packaged aas a kit 40, extra handling of items already commercially available is avoided. However, small items such as the squeege 31 and the sponge 32 add value to the kit as a convenience to the person who will be purchasing the kit 40.

The preferred material of construction for the at least one cushion 11 is an expanded cellular foam polymer with an adhesive side that permits the bumper 11 to adhere to the upturned edge 2A of the tray 2. Such a material is manufactured as an automotive industry gasket by a number of companies, including UNISEAL, Inc., a manufacturing company located at 1800 West Maryland, Evansville, Ind.

As an alternative embodiment of the present inventnion, the at least one cushion 11 packed within the kit 40 to be installed as a part of the tray 2 at the time of assembly of the device 1. The cushion 11 material is normally supplied with a paper covering the adhesive side, as a handling convenience. An additional cushion 11 can be added to the kit 40 for adherence to the end of the pole 6 or the extension pole 9 that rests on a floor, so pole 6 or extension pole 9 slippage is minimized.

The tray 2 and the box 5 in the preferred embodiment of the present invention are of clear plastic and are currently used to package footwear. Such boxes and lids are a product of Sterilite Corporation, an injection molded plastics company located at 198-T Main Street, Townsend, Mass. 01469 according to the 1993 Thomas Register.

An alternate embodiment to the use of the pole 6 and the extension pole 9 for height adjustment is the use of an extendable pole known in the trade as a painter's extendable pole and is available in most hardware stores.

As indicated in FIG. 6, the box 5 serves as a carrier for the instruction sheet 10 which can convey information such as usage instructions or advertising appropriate to a point of purchase display. A problem with new products on a store shelf is that they must convey what they are to the shopper who is walking through the store. Having the instruction sheet 10 affixed to the box 5 serves as a point of purchase display is an advantage of the preferred embodiment of the present invention. Having instruction sheet 10 affixed to a side of the box 5 solves a problem for the do-it-yourself remodeler in that sheets of instruction tend to get lost between jobs and the intermittent do-it-yourselfer may not remember all the finer details of usage and helpful shop hints.

In the preferred embodiment of the present invention, the box 5 is of a clear plastic with the instruction sheet 10 affixed to the inside of the box 5 so the instruction sheet 10 is protected by, and can be read through the clear plastic box 5. The instruction sheet 10, with point of purchase information, such as advertisement material or other puffery, could be either on the inside of the box 5 facing outward, or on the outside of the box 5.

An intended purpose of the preferred embodiment of the present invention is to be a convenience for do-it-yourself home remodelers. Often home remodelers must contend with loose tools and instruction sheets that tend to get lost between jobs. The box 5 of wallpaper border remodeling kit 1 serves as a neat storage box for tools, and with the instruction sheet 10 stuck to the box 5. This is the solution to the problem home remodelers have with loose tools and loose instruction sheets between jobs.

In the preferred embodiment of the present invention, the shaft 5 material would be plastic. However, as obvious to anyone skilled in the art, other materials might serve the same purpose.

In use, the threaded stud 6B of the extension pole 6 is inserted through the clearance 21 of the tray 2. The shaft 4 is threaded onto the threaded stud 6B, securing the tray 2 between the pole 6 and the shaft 4. The shaft 4 is inserted through the roll of wallpaper border 13. Or, the roll of wallpaper border 13 can be placed on the tray 2, around the shaft 4. The tray 2, held between the shaft 4 and the pole 6, supporting the roll of wallpaper border 13 is placed in position as shown in FIG. 3, with the at least one bumper 11 against a wall 14. The function of the bumper 11 is to assist the lid assembly to stay in position. Friction between the bumper 11 and the wall 14 tends to keep the lid assembly 2 in position. This is an advantage over prior art.

Although the description above contains many specificities, these should not be construed as limiting the scope of the invention but as merely providing illustrations of some of the presently preferred embodiments of this invention.

For example a plastic shoe box lid with sides that serve as an upturned edge can be used to fabricate the tray 2 in the preferred embodiment of the present invention. The clearance 21 for the threaded stud 6B is cut into the tray 2. The tray 2, less the at least one cushion 11, could be injection molded with the shaft 4 as one part. The lid could be a flat sheet. This would not be as useful as the tray 2 with the upturned edge 2A to retain any liquid that might escape from the roll of wallpaper border 13 around the shaft 4 on the tray 2. A flat sheet could work, albeit not as well.

Thus the scope of the invention should be determined by the appended claims in the formal application and their legal equivalents, rather than by the examples given.

I claim:

1. A device for the application of a wallpaper border comprising:

a) a tray and b) a shaft wherein the tray further comprises an upturned edge, a clearance, and at least one cushion, wherein the tray can be contained between the shaft and a pole, said pole engaging the shaft, with the tray contained between the pole and the shaft, wherein a roll of wallpaper border can be placed over the shaft and supported by the tray.

2. The device of claim 1 packaged as a kit further comprising:

a container wherein the tray and the shaft are contained in the container.

3. The kit of claim 2 further comprising a squeegee.

4. The kit of claim 2 further comprising a sponge.

5. The kit of claim 2 further comprising an instruction sheet.

6. The kit of claim 2 further comprising at least one cushion.

7. The kit of claim 2 wherein the container is a clear plastic so that the contents of the kit are visible.

8. The kit of claim 2 wherein the container is a box.

9. The kit of claim 2 wherein the container is a bag.

10. The kit of claim 8 wherein the tray serves as a lid for the box.

11. The kit of claim 8 wherein an instruction sheet is affixed to the inside of the box, said box being of clear plastic so the instructions are protected by, and can be read thorugh the plastic box.

* * * * *